US009760321B2

(12) United States Patent
Saito

(10) Patent No.: US 9,760,321 B2
(45) Date of Patent: *Sep. 12, 2017

(54) INFORMATION PROCESSING APPARATUS AND METHOD

(71) Applicant: CANON KABUSHIKI KAISHA, Tokyo (JP)

(72) Inventor: Megumi Saito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 99 days.

This patent is subject to a terminal disclaimer.

(21) Appl. No.: 14/141,517

(22) Filed: Dec. 27, 2013

(65) Prior Publication Data

US 2014/0153023 A1 Jun. 5, 2014

Related U.S. Application Data

(63) Continuation of application No. 11/036,152, filed on Jan. 18, 2005, now Pat. No. 8,640,039.

(30) Foreign Application Priority Data

Jan. 20, 2004 (JP) .................................. 2004-012178
Dec. 16, 2004 (JP) .................................. 2004-364777

(51) Int. Cl.
*G06F 3/048* (2013.01)
*G06F 3/12* (2006.01)
(Continued)

(52) U.S. Cl.
CPC .......... *G06F 3/1225* (2013.01); *G06F 3/1205* (2013.01); *G06F 9/44505* (2013.01); *G06F 9/4446* (2013.01)

(58) Field of Classification Search
CPC .... G06F 3/1204; G06F 3/1285; G06F 3/1205; G06F 3/1208; G06F 3/1225; G06F 3/1229; G06F 3/1254; G06F 3/1275; G06F 21/10; G06F 2221/0706; G06F 3/1288; G06F 19/321; G06F 3/1247; G06F 3/1284; G06F 9/44
See application file for complete search history.

(56) References Cited

U.S. PATENT DOCUMENTS 5,832,298 A * 11/1998 Sanchez ............. H04N 1/00204
370/252
6,148,346 A 11/2000 Hanson ........................ 709/321
(Continued)

FOREIGN PATENT DOCUMENTS

JP         08-278871     10/1996
JP         H08-320781    12/1996
(Continued)

*Primary Examiner* — Linh K Pham
(74) *Attorney, Agent, or Firm* — Fitzpatrick, Cella, Harper & Scinto

(57) ABSTRACT

There is disclosed an information processing method including: a step of displaying a setting window, which includes customizable items, of a device driver; a step of registering items set using the setting window as customized items; a step of writing the customized items in user interface-related data of the device driver; and a user interface display step of displaying a user interface of the device driver with reference to the user interface-related data upon launching the device driver.

14 Claims, 15 Drawing Sheets

(51) Int. Cl.
*G06F 9/445* (2006.01)
*G06F 9/44* (2006.01)

(56) References Cited

U.S. PATENT DOCUMENTS

| | | | |
|---|---|---|---|
| 6,314,186 B1 | 11/2001 | Lee et al. | 380/28 |
| 6,327,613 B1 * | 12/2001 | Goshey | G06F 9/468 |
| | | | 707/999.008 |
| 6,615,346 B1 | 9/2003 | Kawamoto | 713/100 |
| 6,642,943 B1 | 11/2003 | Machida | 345/763 |
| 6,883,981 B2 | 4/2005 | Kizaki et al. | 400/76 |
| 6,924,826 B1 | 8/2005 | Nakagiri et al. | 345/700 |
| 6,993,724 B2 | 1/2006 | Minagawa | 71/810 |
| 7,057,747 B1 | 6/2006 | Minagawa | 358/1.13 |
| 7,194,696 B2 | 3/2007 | Mori | 715/783 |
| 7,233,411 B2 * | 6/2007 | Kuroda | G06K 15/00 |
| | | | 358/1.18 |
| 7,301,656 B1 * | 11/2007 | Nakagiri | G06F 3/1207 |
| | | | 358/1.15 |
| 7,444,394 B2 | 10/2008 | Igarashi et al. | 709/223 |
| 2001/0030755 A1 * | 10/2001 | Yamade | B41J 11/0075 |
| | | | 358/1.1 |
| 2001/0053295 A1 | 12/2001 | Kujirai et al. | 399/79 |
| 2002/0161936 A1 * | 10/2002 | Minagawa | G06K 15/002 |
| | | | 710/1 |
| 2003/0007181 A1 | 1/2003 | Nishikawa et al. | 358/1.18 |
| 2003/0052441 A1 * | 3/2003 | Nakagiri | B41J 11/42 |
| | | | 270/37 |
| 2003/0053106 A1 * | 3/2003 | Kuroda | G06F 3/1203 |
| | | | 358/1.13 |
| 2003/0056178 A1 | 3/2003 | Sato | 715/527 |
| 2003/0056179 A1 | 3/2003 | Mori | 715/530 |
| 2003/0070146 A1 | 4/2003 | Sato et al. | 715/525 |
| 2003/0131072 A1 * | 7/2003 | Kobayashi | 709/218 |
| 2003/0137691 A1 | 7/2003 | Tanaka | 358/1.15 |
| 2003/0160774 A1 | 8/2003 | Minagawa | 345/204 |
| 2003/0206198 A1 * | 11/2003 | Kawamoto | 345/771 |
| 2003/0231327 A1 | 12/2003 | Ashey et al. | 358/1.13 |
| 2004/0017580 A1 * | 1/2004 | Kuroda | G06F 3/1204 |
| | | | 358/1.13 |
| 2004/0085563 A1 | 5/2004 | Nishimura | 358/1.13 |
| 2004/0107855 A1 * | 6/2004 | Kizaki | G06F 3/1211 |
| | | | 101/484 |
| 2004/0111675 A1 | 6/2004 | Mori et al. | 715/513 |
| 2004/0181747 A1 | 9/2004 | Hull et al. | 715/500.1 |
| 2005/0039193 A1 * | 2/2005 | Choi et al. | 719/321 |
| 2005/0046876 A1 | 3/2005 | Burget et al. | 58/1.1 |
| 2005/0073709 A1 | 4/2005 | Kujirai et al. | 358/1.15 |
| 2005/0088677 A1 * | 4/2005 | Hayashi | H04N 1/324 |
| | | | 358/1.13 |
| 2005/0097238 A1 | 5/2005 | Oomori et al. | 710/15 |
| 2005/0117180 A1 | 6/2005 | Kato | 358/1.15 |
| 2005/0128500 A1 * | 6/2005 | Nakagiri | B41J 11/42 |
| | | | 358/1.9 |
| 2005/0134871 A1 | 6/2005 | Nakagiri | 358/1.6 |
| 2005/0200881 A1 * | 9/2005 | Yamade | B41J 11/0075 |
| | | | 358/1.14 |

FOREIGN PATENT DOCUMENTS

| | | |
|---|---|---|
| JP | H11-232059 | 8/1999 |
| JP | 2000-222159 | 8/2000 |
| JP | 2000-330919 | 11/2000 |
| JP | 2002-202868 | 7/2002 |
| JP | 2003-208276 | 7/2003 |
| JP | 2003-216374 | 7/2003 |
| JP | 2005-157479 | 6/2005 |
| KR | 1999-002840 | 1/1999 |

* cited by examiner

FIG. 10

```
typedef struct_devicemode {   /* dvmd */
    TCHAR   dmDeviceName[32] ;
    WORD    dmSpecVersion ;
    WORD    dmDriverVersion ;
    WORD    dmSize ;
    WORD    dmDriverExtra ;
    DWORD   dmFields ;
    short   dmOrientation ;
    short   dmPaperSize ;
    short   dmPaperLength ;
    short   dmPaperWidth ;
    short   dmCopies ;
} DEVMODE ;
```

F I G. 12
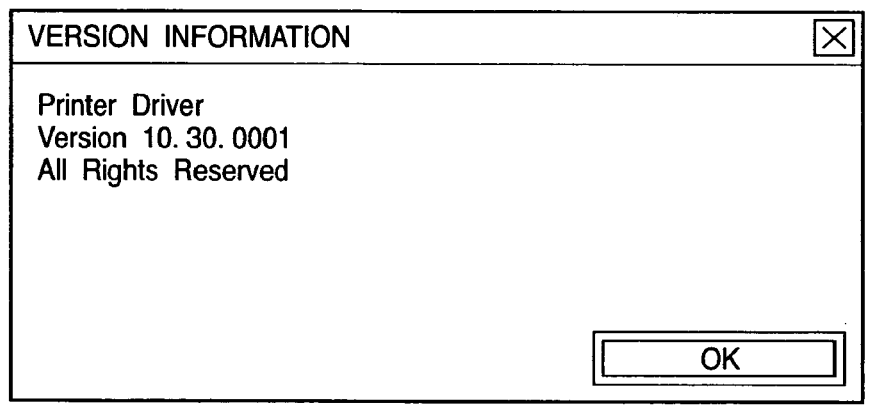

INFORMATION PROCESSING APPARATUS AND METHOD

CROSS REFERENCE TO RELATED APPLICATION

This application is a continuation of U.S. application Ser. No. 11/036,152 filed on Jan. 18, 2005, the entire disclosure of which is hereby incorporated by reference herein.

FIELD OF THE INVENTION

The present invention relates to an information processing apparatus which can mount a device driver, a control method, a control program, and a storage medium.

BACKGROUND OF THE INVENTION

For example, an information processing apparatus which outputs data such as print data or, the like stores default values in an area determined according to a given rule. Therefore, default values remain unchanged unless the contents of that area are changed, and arbitrary values of user's choice cannot be set as default values. One method allows various settings via a user interface (UI) by providing a list of setting items whose default values are to be changed and values to be set as default values. Also, another method has a function of restoring defaults irrespective of setting items that have been changed upon changing the values of setting items. For example, a given printer driver has a select item "restore defaults", and respective setting values can be restored to default values by selecting this item.

However, default values used in such printer driver are predetermined values, and the user cannot change them to arbitrary values of his or her choice. This is because the printer driver is prepared after default values are designated.

Therefore, in order to use values designated by various users as default values, printer drivers which have values designated by respective users as default values must be prepared in correspondence with the number of requirements or printer drivers must be prepared by combining all default values. Alternatively, arbitrary values designated by each user are stored in addition to these default values, and when values of user's choice are available upon loading the default values, these values are loaded and displayed in place of the default values. However, a complicated process is required to load various default values for print settings in correspondence with users. For this purpose, each user must understand the data structure of print settings, and also the detailed specifications of printer drivers, which are modified frequently, resulting in impractical proposals.

SUMMARY OF THE INVENTION

The present invention has been made in consideration of at least one of the aforementioned problems.

It is one object of the present invention to provide an information processing apparatus and method, which allow the user to easily customize default values to be set in a device driver.

It is another object of the present invention to provide an information processing apparatus and method which can limit some user operations from the UI of a device driver by customizing the device driver.

An information processing apparatus according to one aspect of the present invention comprises the following arrangement. That is, an information processing apparatus comprises:

means for displaying a setting window, which includes customizable items, of a device driver;

means for registering items set using the setting window as customized items;

means for writing the customized items in user interface-related data of the device driver; and UI display means for displaying a UI of the device driver with reference to the user interface-related data upon launching the device driver.

An information processing method according to another aspect of the present invention comprises the following steps. That is, an information processing method comprises:

a step of displaying a setting window, which includes customizable items, of a device driver;

a step of registering items set using the setting window as customized items;

a step of writing the customized items in user interface-related data of the device driver; and a UI display step of displaying a UI of the device driver with reference to the user interface-related data upon launching the device driver.

A device driver according to still another aspect of the present invention comprises the following arrangement. That is, a device driver comprises:

means for displaying a UI including setting items of the device driver;

means for registering items set using the user interface as default setting values in user interface-related data of the device driver; and UI display means for displaying a UI of the device driver on the basis of the user interface-related data upon launching the device driver.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

FIG. 10 shows an example of the device mode (DEVMODE) data structure according to the embodiment of the present invention;

FIG. 12 shows an example of a version display dialog of the printer driver according to the embodiment of the present invention;

DETAILED DESCRIPTION OF THE PREFERRED EMBODIMENTS

Preferred embodiments of the present invention will now be described in detail in accordance with the accompanying drawings.

Figure 1:
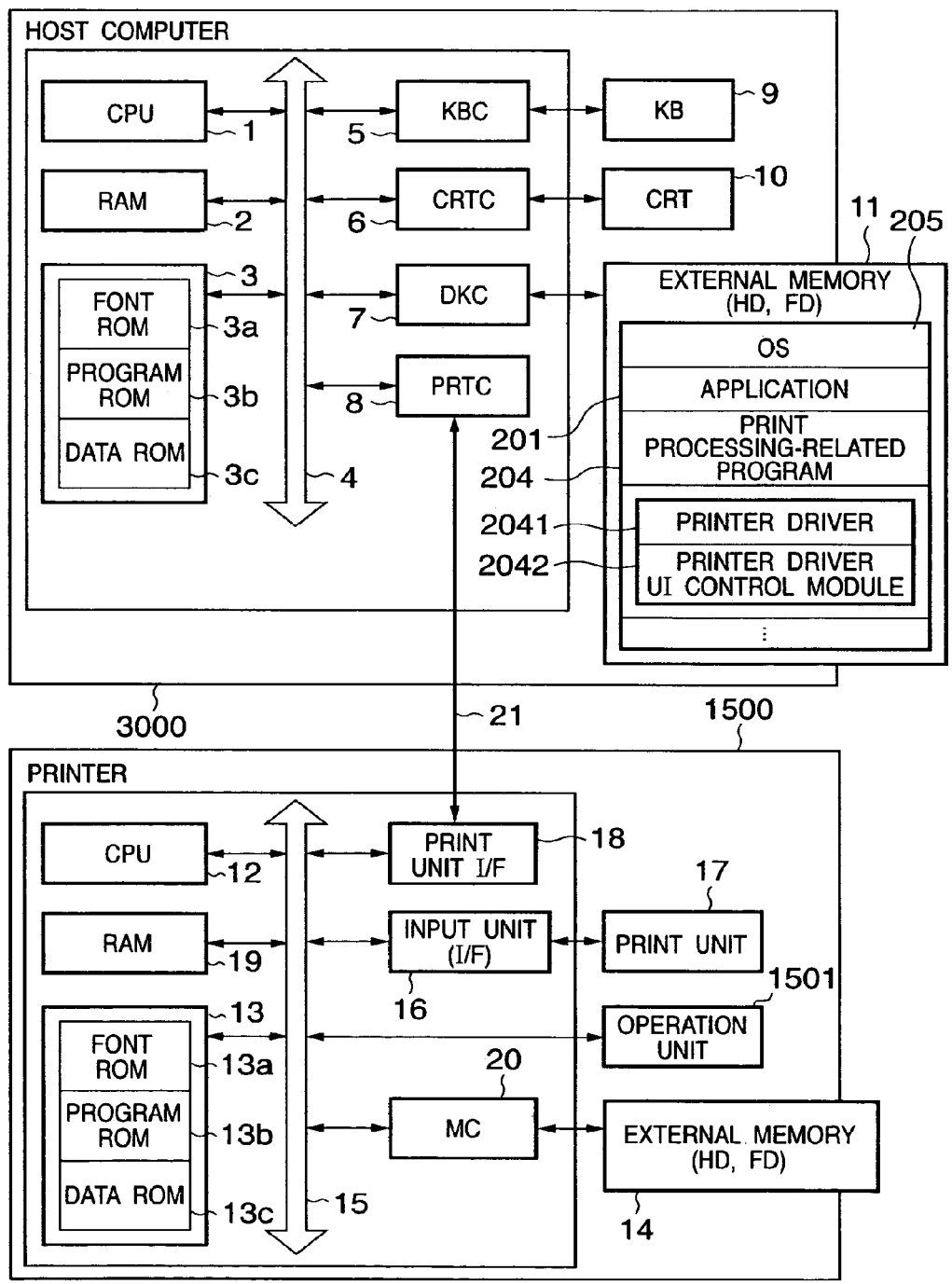
FIG. 1 is a block diagram showing the arrangement of a print processing system according to an embodiment of the present invention.

FIG. 1 is a block diagram showing the arrangement of a print processing system according to an embodiment of the present invention. This print processing system comprises a host computer 3000, and a printer 1500 which receives print data from the host computer 3000 and performs a print process.

In the host computer 3000, a CPU 1 systematically controls devices connected to a system bus 4 in accordance with programs stored in a RAM 2. The RAM 2 also serves as a main memory, work area, and the like of the CPU 1. A ROM 3 stores various programs and data, and is separately formed as a font ROM 3a that stores various fonts, a program ROM 3b that stores a boot program, BIOS, and the like, and a data ROM 3c that stores various data.

A keyboard controller (KBC) 5 controls key inputs from a keyboard (KB) 9 and a pointing device (mouse; not shown). A CRT controller (CRTC) 6 controls display on a CRT display (CRT) 10. A disk controller (DKC) 7 controls access to an external memory 11 such as a hard disk or the like. A printer controller (PRTC) 8 is connected to a two-way interface 21, and makes a communication control process with the printer 1500.

The external memory 11 includes, e.g., a hard disk (HD), MO, Floppy® disk (FD), and the like, and stores various applications (e.g., a document processing application program used to execute a document process including graphics, images, text, tables, and the like) 201, and a print processing related program 204 in addition to an operating system program (to be referred to as an OS hereinafter) 205. Also, the external memory 11 stores user files, edit files, and the like. The print processing related program 204 is a program that generates print data described using a page description language, and can be commonly used for a plurality of printers of the same series. Also, this print processing related program 204 includes a printer control command generation module (to be referred to as a printer driver hereinafter) 2041, and printer driver user interface (UI) control module 2042.

The applications 201 including a customize tool program (to be simply referred to as a customize tool hereinafter) according to this embodiment are loaded onto the RAM 2 and are executed by the CPU 1. The CPU 1 executes a rasterize process of outline font data onto the RAM 2 to allow WYSIWYG (What You See Is What You Get) on the CRT 10. Furthermore, the CPU 1 opens various registered windows on the basis of commands designated by a mouse cursor (not shown) or the like on the CRT 10, and executes various data processes. Upon executing a print process, the user opens a print setting window (controlled by the printer driver UI control module 2042), and can make settings of the printer, and settings of a print process for the printer driver 2041 including selection of a print mode.

The arrangement of the printer 1500 will be described below.

A CPU 12 controls the overall operations of the printer 1500. A RAM 19 serves as a main memory, work area, or the like, and is also used as an output information rasterize area and environment data storage area. Also, this RAM 19 comprises an NVRAM (nonvolatile RAM) area, and its memory size can be expanded by an option RAM connected to an expansion port (not shown). A ROM 13 comprises a font ROM 13a that stores various fonts, a program ROM 13b that stores a control program and the like to be executed by the CPU 12, and a data ROM 13c that stores various data. An input unit 18 exchanges data with the host computer 3000. A print unit interface 16 controls interfacing with a print unit 17 as a printer engine.

An external memory 14 undergoes access control by a memory controller (MC) 20, and includes a hard disk (HD), MO, Floppy® disk (FD), IC card, and the like, which are connected as options. The external memory 14 stores font data, emulation programs, form data, and the like. When the external memory 14 such as a hard disk or the like is not connected, the data ROM 13c of the ROM 13 stores information and the like used by the host computer 3000. Note that the number of external memories 14 is not limited to one, and a plurality of external memories 14 may be connected. For example, a plurality of external memories such as an option font card in addition to built-in font data, an external memory that stores a program used to interpret a printer control language of a different control system and the like may be connected.

An operation unit 1501 has a control panel that accepts user operations, and switches, LED indicators, and the like for operations are arranged on that control panel (not shown). The printer may have an NVRAM (not shown) which stores printer mode setting information from the control panel.

The CPU 12 outputs an image signal as output information to the print unit (printer engine) 17 via the print unit interface 16 on the basis of the control program and the like stored in the program ROM 13b of the ROM 13. The CPU 12 can communicate with the host computer 3000 via the input unit 18. The CPU 12 receives print data sent from the host computer 3000, and can notify the host computer 3000 of its internal information and the like.

Figure 2:
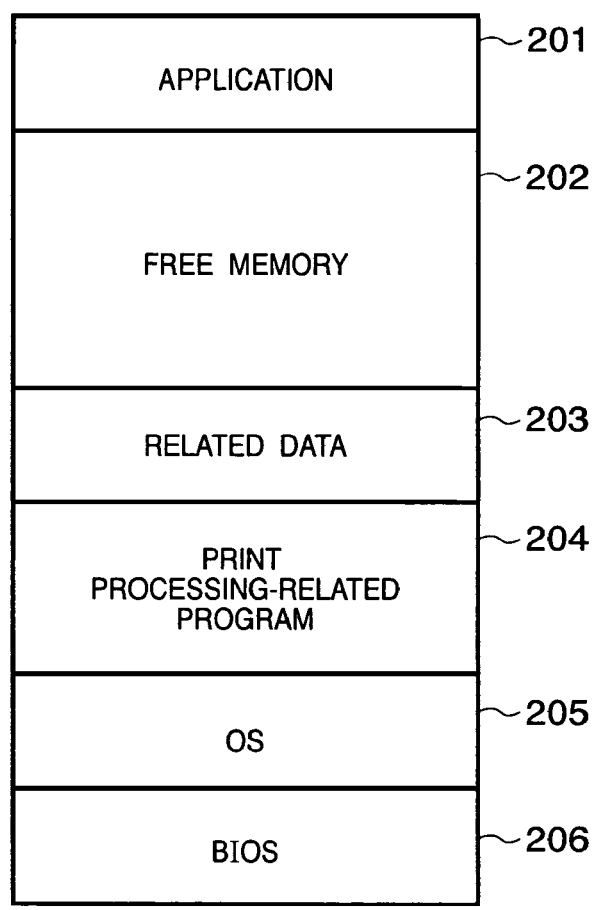
FIG. 2 shows a memory map of a RAM after a predetermined application and print processing related program are launched, and programs and data are loaded onto the RAM of a host computer.

FIG. 2 shows a memory map of the RAM 2 when a predetermined application and the print processing related program are launched, and the programs and data are loaded onto the RAM 2 of the host computer 3000. On the RAM 2, the applications 201, the print processing related program 204, and related data 203 are loaded in addition to a BIOS 206 and the OS 205. Furthermore, a free memory area 202 is assured. As a result, the applications 201 and print processing related program 204 are ready to run. Note that the printer driver UI control module 2042 (FIG. 1) of the print processing related program 204 displays the print setting window on the CRT 10 in accordance with a user's print setting command, and allows the user to make settings using the KB 9 and the like.

Figure 3:
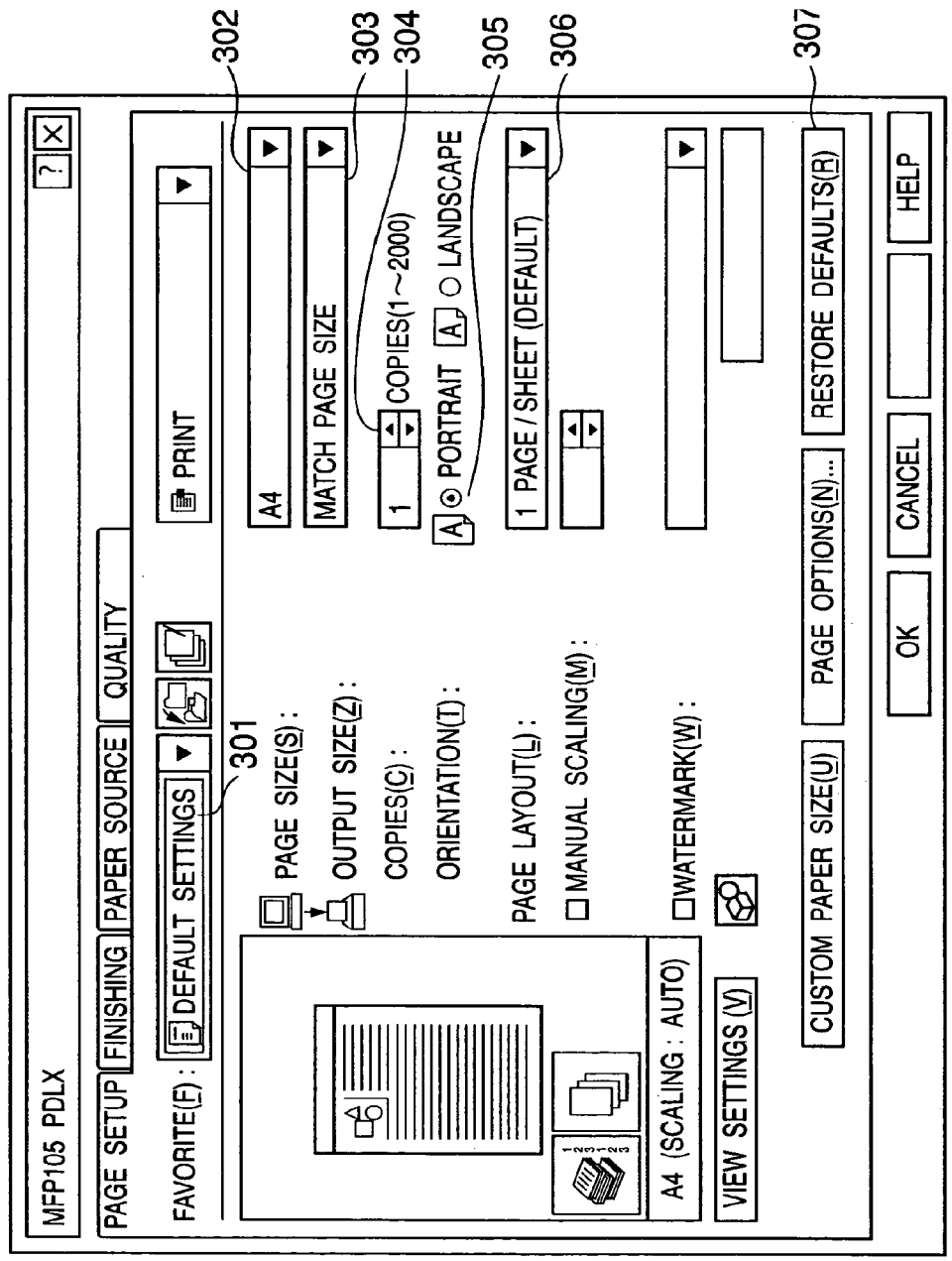
FIG. 3 shows a "page setup" window of a print setting window.

FIG. 3 shows a display example of the print setting window on the host computer 3000 according to this embodiment.

FIG. 3 shows a "page setup" window of the print setting window in case of "default settings", as indicated by 301. In the default settings, a page size 302 is "A4", an output size 303 is "match page size", the number of copies 304 is "1", a print orientation 305 is "portrait", and a page layout 306 is "1 page/sheet".

When this window is displayed for the first time or when the user designates a "restore defaults" button 307, default values of respective items are displayed. At this time, the print processing related program 204 (FIG. 2) loads default values and displays them on the window shown in FIG. 3.

Figure 4:
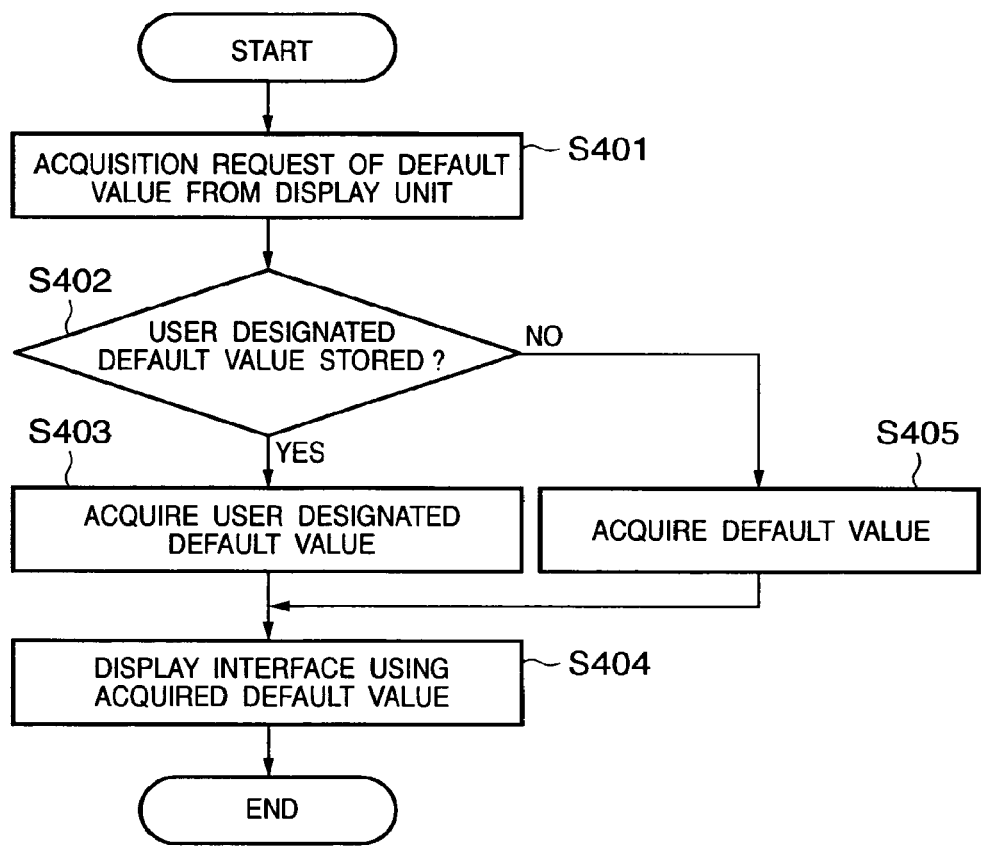
FIG. 4 is a flowchart for explaining a default value display process in a print processing related program according to the embodiment of the present invention.

FIG. 4 is a flowchart for explaining a display process of default values on the UI window upon starting up a driver shown in FIG. 3. Note that default values are stored in an area according to a rule of a basic system of the host computer 3000, and those which are designated by the user are stored in another area, as will be described later.

Upon detection of a default value acquisition request in step S401, the flow advances to step S402 to check if default values of user's choice are stored. If default values of user's choice are stored, the flow advances to step S403, the default values of user's choice are acquired, and these values are displayed in step S404. On the other hand, if no default values of user's choice are stored in step S403, the flow advances to step S405, default values designated in advance are acquired, and these values are displayed in step S404. Note that the default values of user's choice are stored in a UI-related data file (UPD file) of the printer driver.

Figure 5:
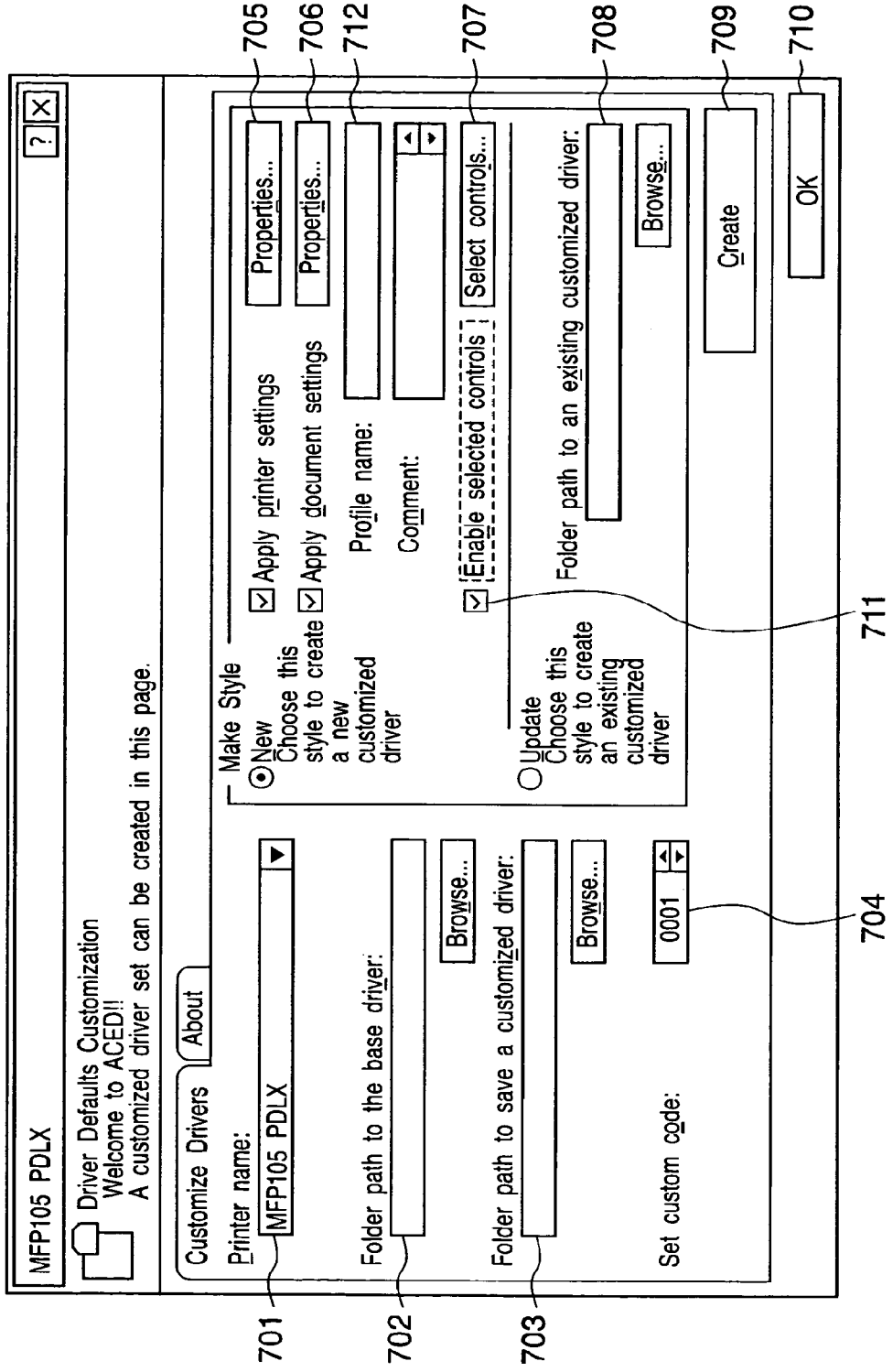
FIG. 5 shows an example of a UI of a customize tool according to the embodiment of the present invention.

FIG. 5 shows an example of a UI of the customize tool according to this embodiment, which is included in the applications 201 stored in the external memory 11. FIG. 5 shows the UI used to designate whether or not respective controls are enabled on the printer driver UI, and a list of controls which are disabled on this UI can be stored in the UI-related UPD file of the printer driver as customize data. This example will be explained later with reference to FIG. 8.

Checked ones of a plurality of check boxes indicate enabled controls. Also, unchecked check boxes indicate disabled controls. When the user checks check boxes of controls to be enabled and unchecks those of controls to be disabled, he or she can reflect settings upon clicking a "create" button.

One characteristic feature of this customize tool lies in that the printer driver 2041 to be customized is installed, and default'values can be easily set.

Figure 6:
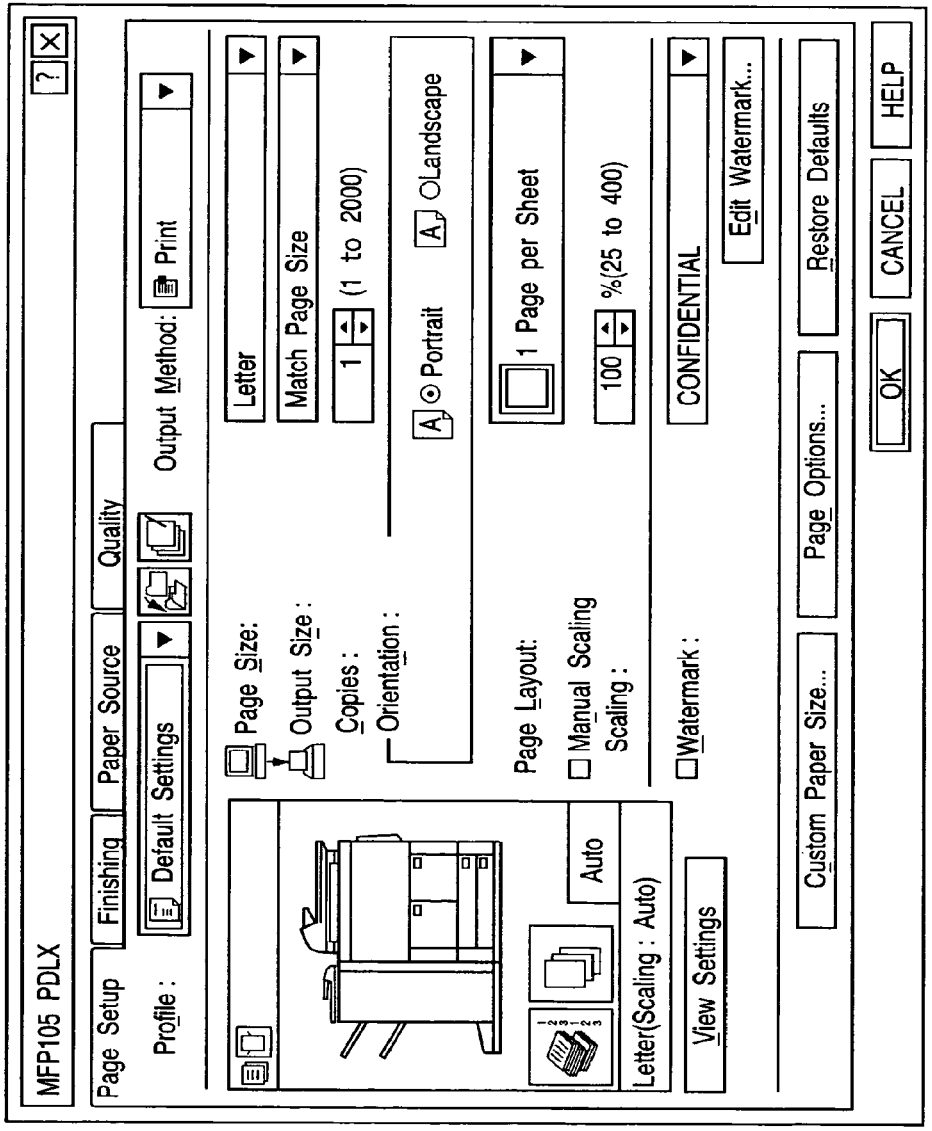
FIG. 6 shows an example of a UI of a printer driver.

More specifically, for example, when the user checks a check box "Apply printer settings", and clicks a property button 706 of "Apply document settings", the UI of the printer driver is displayed, as shown in FIG. 6.

FIG. 6 shows default print settings. In this case, the page size is "letter size", the output size is "match page size", the number of copies is "1", and the page layout is "one page/sheet".

Figure 7:
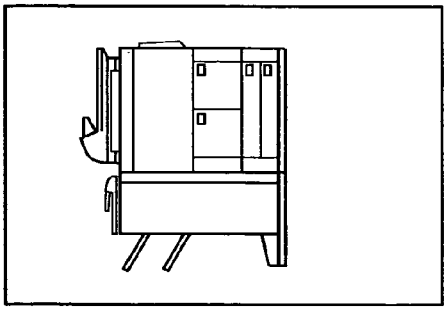
FIG. 7 shows an example of a printer driver UI for a system administrator.

For example, when the user checks the check box "Apply printer settings" and clicks a property button 705 of "Apply printer settings", a printer driver UI for a system administrator is displayed, as shown in FIG. 7. In FIG. 7, settings of a deck that supplies paper sheets as paper source options, an output destination of printed paper sheets, and the like are designated.

This customize tool is implemented by utilizing a mechanism in which the OS 205 (FIG. 1) of the host computer reads out the printer driver 2041. For this reason, conflicts of the printer driver 2041 are also evoked, and default values of the customized printer driver 2041 can be surely recognized.

In FIG. 5, reference numeral 701 denotes a printer name used in a print process; 702, a path to a base driver; and 703, a path to a holder that stores the customized driver. An input box 704 is an input column of a custom code used to specify the customized contents, and allows to input an arbitrary value. When this value is displayed on a dialog that displays version information of the printer driver (see FIG. 12) or a dialog that displays a list of settings, the user can determine whether or not the installed printer driver has been customized. A "Select controls" button 707 is used to select controls when "Enable selected controls" check box is checked to enable selected controls.

When a "Create" button 709 is clicked, the UI-related UPD file of the printer driver is changed and a customized UPD file is created. When this "Create" button 709 is clicked, the customized driver set other than the UPD file to be changed is copied to an area where the customized driver set is stored, and the UPD file is stored after a change process. The UPD file change process will be described later.

A case will be described below wherein the printer driver is updated using the display window shown in FIG. 5.

This update process updates the customized printer driver in this embodiment, and is executed when an "Update" radio button of "Make Style" is checked. The folder path of the customized driver set is input to the input field 702, the folder path of the base driver set to be updated is input to an input field 708, and the "Create" button 709 is clicked. As a result, the customized driver set other than the UPD file to be changed is copied to an area designated by the input field 703, and the UPD file is stored at the corresponding address of that driver after the change process. For example, when the customized driver corresponding to PDLX version 6.30 is updated to PDLX6.40, a PDLX6.40 driver that inherits custom setting of PDLX6.30 is created.

Figure 8:
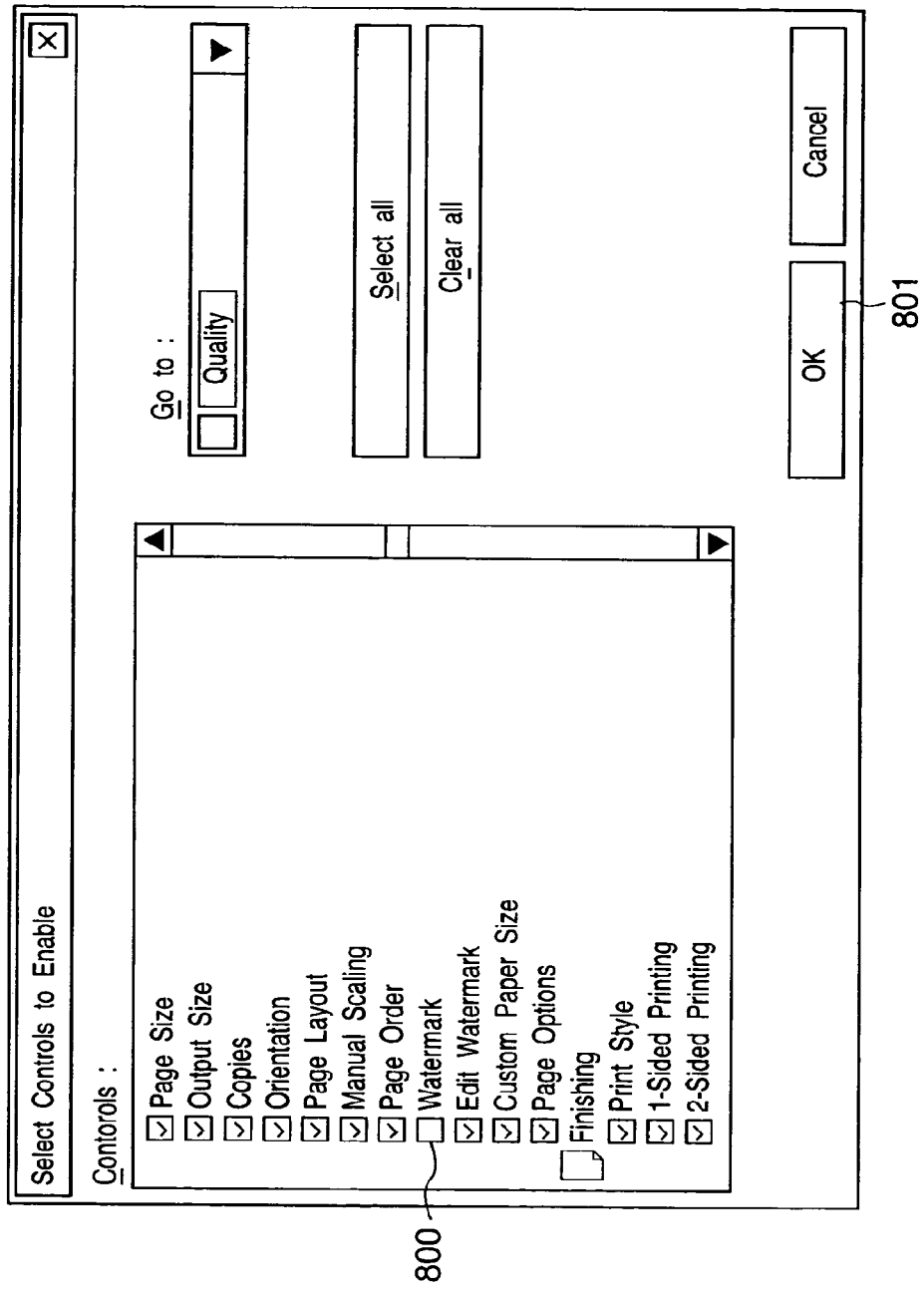
FIG. 8 shows an example of a UI displayed by the customize tool shown in FIG. 5.

FIG. 8 shows a UI displayed when a check box 711 is checked to enable controls, and the "Select controls" button 707 is clicked on the customize tool in FIG. 5. This display control is executed by the customize tool.

In FIG. 8, a "Watermark (stamp)" check box 800 used to limit controls is unchecked. When an OK button 801 is clicked in this state, the display is returned from FIG. 8 to FIG. 5, and the customize tool stores the customized state at that time. When the "Create" button 709 is clicked, the customize tool creates a UPD file written with a value which indicates an instruction that disables the UI of "Watermark".

Figure 9:
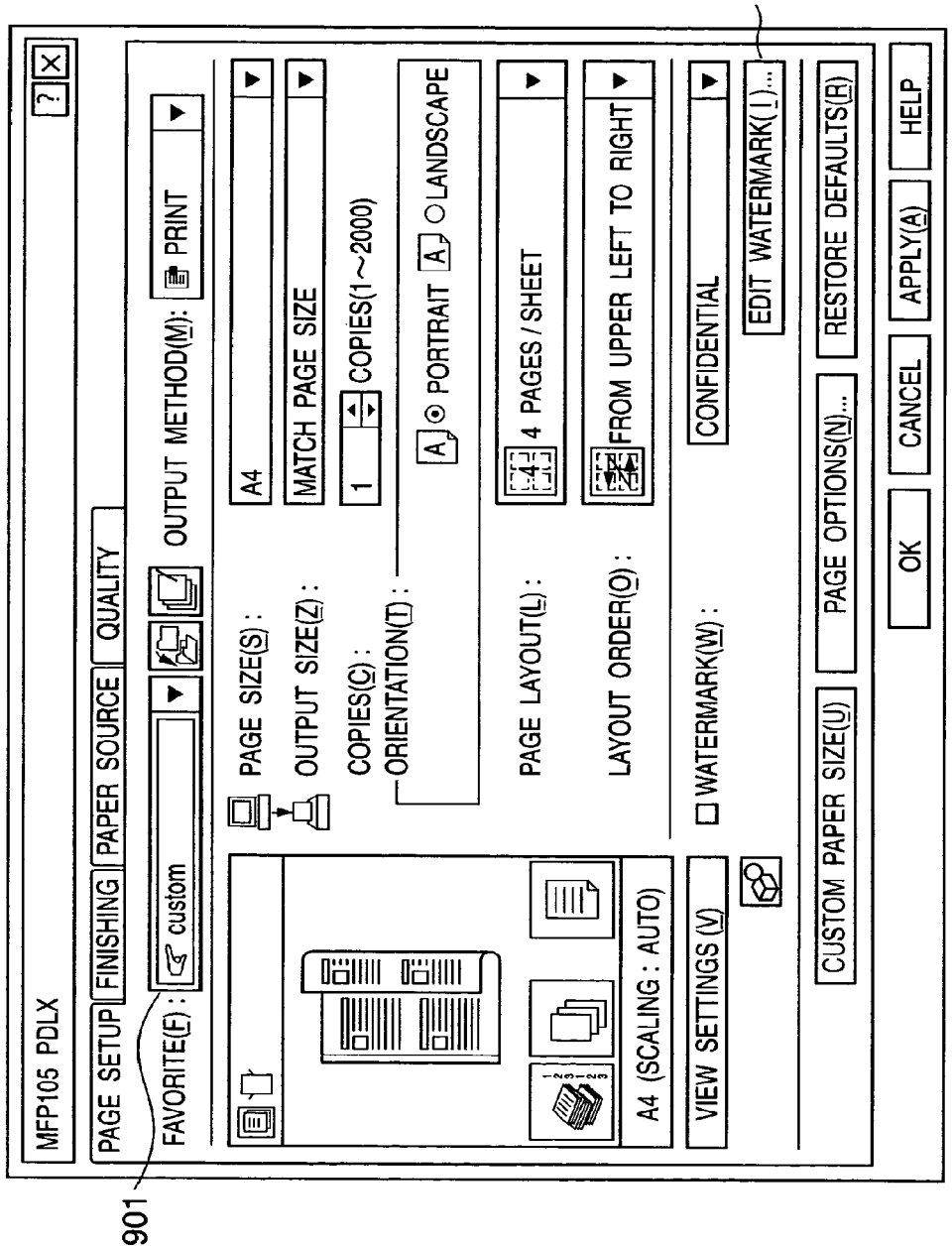
FIG. 9 shows an example of the printer driver which has been customized according to the embodiment of the present invention.

FIG. 9 shows an example of the UI of the printer driver 2041 which is customized in this way.

The printer driver customized as described above loads the UPD file created by the customize tool upon installation or launching, and displays the UI shown in FIG. 9. Since the "Watermark" check box 800 is unchecked in the example of FIG. 8, "Watermark" controls 900 in FIG. 9 are grayed out, thus limiting and inhibiting user's operations for "Watermark".

In this way, when the user checks/unchecks the check boxes of the UI shown in FIG. 8, controls that cannot be set by the user can be installed as presets in the printer driver 2041, thus customizing the printer driver 2041.

In this embodiment, the printer driver is implemented so that "favorite" is internally created using the customized device mode (DEVMODE), and is displayed at the head of a "favorite" combo box of the printer driver. The device mode is an address term of the prevalent data structure used to store print setting data defined by the OS. In the format of the data structure of this device mode, various print settings are stored in a registry area managed by the OS or a UPD file area 503 (FIG. 13) stored in the HD 11.

The printer driver 2041 executes print settings by reading out the registry area upon operation. The printer driver 2041 reads out this device mode to generate PDL data that undergoes print settings accordingly, and transfers that PDL data to the printer to print it. In this way, the printer executes a print process according to print settings in the PDL format transferred from the printer driver.

When the customize tool of this embodiment is used, "favorite" corresponding to "default settings" provided as a vendor preset is created. For example, when the user inputs print settings of staple and watermark using the customize tool, these print settings are written at a predetermined address of data 503 of the UPD file as the device mode (DEVMODE). Since the customized printer driver is installed to read out the predetermined address, the value of the device mode (DEVMODE) is set in the printer driver as default settings by reading out the predetermined address. Furthermore, "favorite" having this device mode (DEVMODE) value as a setting value is added. The driver with such implementation is often called a customize compatible driver.

Note that the name of this "favorite" uses that input to a "Profile name" edit box 712 in FIG. 5 on the customize tool.

"Favorite" added by the customize tool is added at the head of the "favorite" combo box, and its sorting may be inhibited. Data of "favorite" added by the customize tool is not saved in the registry (storage area) unlike "favorite" of a normal device driver, and cannot be edited from the driver UI like "favorite" as defaults of the driver (a red dot indicating that corresponding "favorite" data cannot be edited is displayed). Therefore, data of "favorite" added by the customize tool can be inhibited from being displayed on a "favorite" add/edit dialog. Furthermore, a finger icon (e.g., 901 in FIG. 9) is displayed as an example of a "customized" mark together with data of "favorite" added by the customize tool. The data of "favorite" added by the customize tool is used when the user wants to restore customized print settings after he or she has changed print setting data by operating the driver UI.

Since "favorite" added by the customize tool is not displayed on a "favorite" tag displayed on a property window of a printer folder of the Windows® NT-based OS. Hence, a function of inhibiting "favorite" from being selected by disabling "permit favorite selection" cannot be used for "favorite" added by the customize tool. A function corresponding to this function can be implemented by unchecking a favorite (Profile) control check box upon control selection.

FIG. 10 shows an example of this device mode (DEVMODE) data structure.

As shown in FIG. 10, the paper orientation (dmOrientation), paper size (dmPaperSize), paper width (dmPaperWidth), the number of copies (dmCopies), and the like are stored. This DEVMODE data structure is stored in the registry. The printer driver 2041 reads/writes the DEVMODE data structure stored in the registry to load a default print setting environment and "favorite" settings (to be described later), thus reflecting it on the user interface.

Note that "favorite" includes a group of a plurality of print settings of the printer driver 2041. The user designates "favorite" from the group of settings on the user interface of the printer driver 2041, thus obtaining a desired operation environment. For example, when the user frequently uses watermark and staple settings, he or she registers a combination of watermark and staple settings as "favorite", and can set a plurality of settings to be desired values by selecting this "favorite" upon printing.

As an example of print settings that can be stored in this device mode, the following items are defined in addition to the example shown in FIG. 10. That is, a page size, output size, page layout (the number of logical pages to be formed per physical sheet), watermark, page frame, no frame, date print ON/OFF, user name print ON/OFF, page number print ON/OFF, overlay print ON/OFF, and the like can be defined as print settings of the page setup. Furthermore, double-sided print, binding direction (long-side binding, short-side binding), binding margin, delivery destination, whether or not a delivery destination is changed for respective copies, whether or not a TrueType font is replaced by a printer font, whether or not printing is made in a toner save mode, whether or not a TypeWing function is used, whether or not an image acceleration process is made, whether or not a PDF file is always printed in an image mode; and the like can be set. Furthermore, all these settings are stored as the device mode, and are handled as "favorite" by the customize compatible printer driver and customize tool according to this embodiment.

Figure 11:
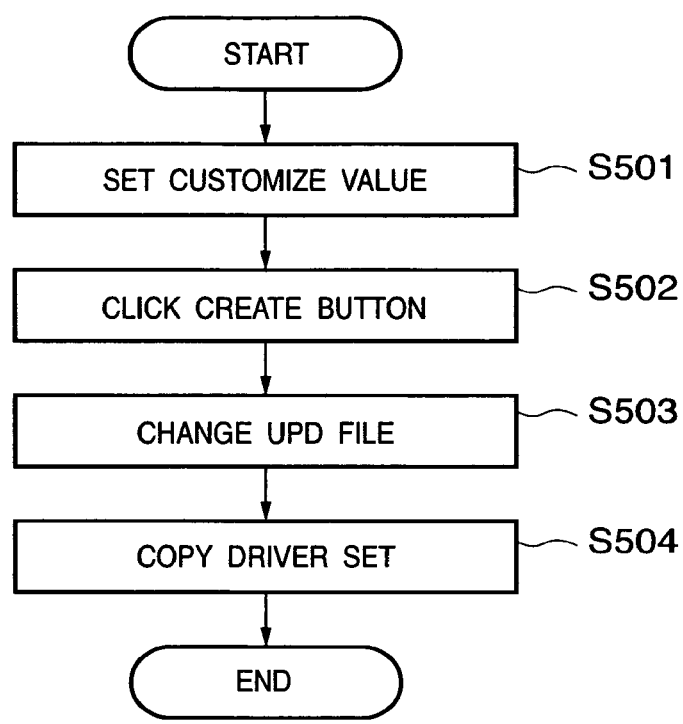
FIG. 11 is a flowchart showing the operation of the customize tool according to the embodiment of the present invention.

FIG. 11 is a flowchart showing the operation of the customize tool according to this embodiment.

In step S501, setting values are changed to obtain those to be customized. For example, the display window in FIG. 5 is displayed, and the user sets the custom code 704, and sets the property 705 of "Apply printer settings", the property 706 of "Apply document settings", and the like to his or her desired values on that window. If the user clicks the "Create" button 709 in step S502, the UPD file as a UI-related data file of the printer driver 2041 is changed in step S503. In step S504, that driver set is copied to the base printer driver.

Figure 13:
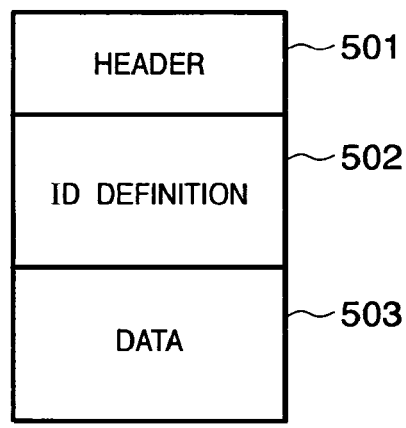
FIG. 13 is a view for explaining the data format of a UPD file.

FIG. 13 is a view for explaining the data format of the UPD file.

As shown in FIG. 13, the UPD file includes a header 501, ID definition 502, and data 503. The ID definition 502 stores a set of an ID of data stored in the data 503 and a storage position (address) of that data. Such sets are stored in correspondence with the number of IDs. The customize tool according to this embodiment changes data values corresponds to IDs defined for customization. If no ID of customize data to be used is defined in the ID definition 502, a new ID corresponding to that customize data is added to the ID definition 502.

The UPD file is present for each device driver. Hence, the following customization can be made. That is, using the customized driver set corresponding to a given model, a driver set for another model can be customized. For example, using the setting contents of the customized driver set for a given model, a driver set of another model can be customized. Since the ID definition 502 uses customize IDs, a printer driver of new version can inherit settings of the previously customized printer driver.

Note that the customize compatible printer driver is customized by the customize tool. The printer driver is implemented to load the UPD file upon installation or first launching, and to load the data 503 stored in correspondence with the predetermined ID of the ID definition 502 of the UPD file. For example, assume that the UPD file created by the customize tool stores an ID indicating "CUSTOMIZED" in the ID definition 502 and address X as its data storage position.

Upon completion of installation or first launching, when ID information indicating "CUSTOMIZED" is stored in the ID definition 502, the customize compatible printer driver is implemented to read out the address corresponding to that information. Hence, Hence, when the ID definition 502 of the UPD file includes the ID indicating "CUSTOMIZED", this printer driver reads out address X of the corresponding data from that ID definition upon completion of installation or first launching. Next, the printer driver further reads out the device mode data structure as actual driver setting data from the data 503 at address X. Note that address X may be an absolute address or the start address of the data 503 may be stored in the header 501 and an offset address from the start address of the data 502 may be set as address X.

By preparing the UPD file in this way, the customized printer driver automatically loads the UPD file created by the customize tool upon completion of installation or first launching, and automatically presets its default setting values as the device mode. As a result, the operation environment of the customized printer driver can be easily developed.

Figure 14:
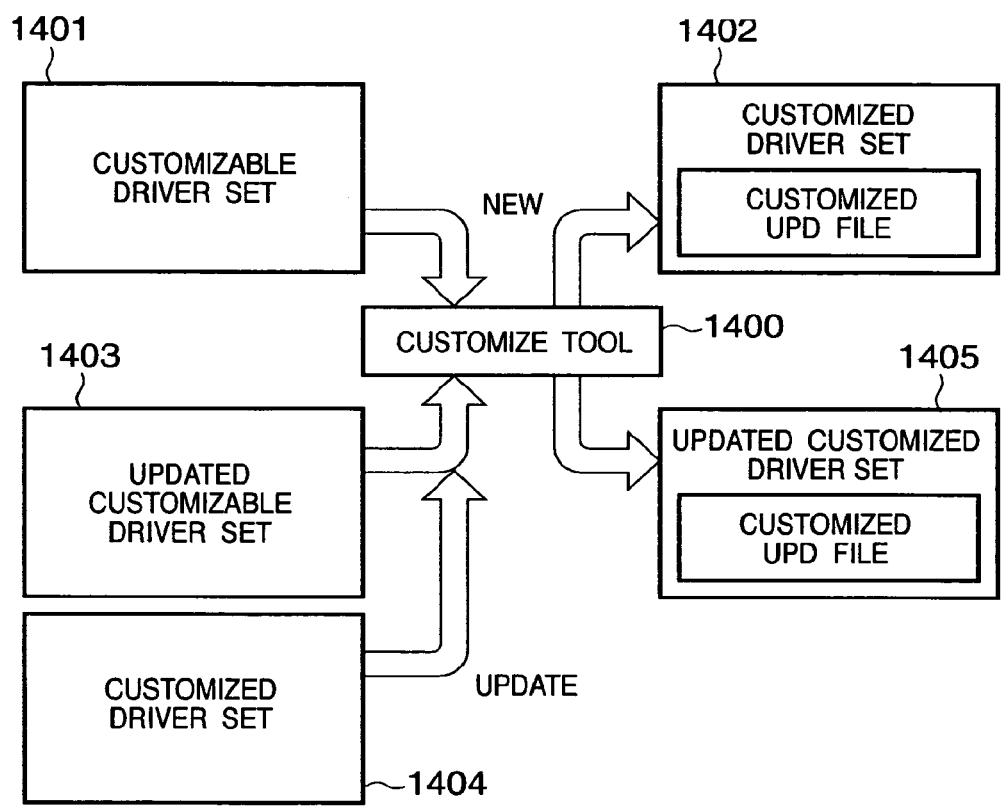
FIG. 14 is a view for explaining customization of a driver set according to the embodiment of the present invention.

FIG. 14 is a view for explaining customization of a driver set. In FIG. 14, a driver set required upon creating a driver set by a customize tool 1400 of this embodiment, and a driver set to be created will be explained.

The upper half of FIG. 14 illustrates a state wherein a newly customized driver set is created (corresponding to a case wherein a "New" radio button of "Make Style" in FIG. 5 is selected). The customize tool 1400 creates, based on a customizable base driver set 1401, a customized driver set 1402 by rewriting a UPD file in that driver set.

The lower half illustrates a state upon update (corresponding to a case wherein an "Update" radio button of "Make Style" in FIG. 5 is selected). In this state, a driver of new version inherits settings of the previously customized driver. Using an updated, customizable base driver set 1403, and an already updated (customized) driver set 1404 of old version, the customize tool 1400 transfers customize data of the already customized driver set 1404 of old version to the updated, customizable driver set 1403, thus generating an updated, customized driver set 1405. This customize tool 1400 is required when the new customized driver set 1402 is created and when the driver of new version inherits setting of the previously customized driver.

FIG. 12 shows an example of a version display of the printer driver. In the example of FIG. 12, the custom code ("0001") is appended to the version number displayed on the version information dialog.

The custom driver adds and displays the custom code value 704 input using the customize tool after the version number of the driver displayed on the "version information" tab of the driver UI.

The UPD file change process by the customize tool according to this embodiment will be described below.

The customize tool creates a customized driver set in the following sequence. A customize compatible base driver set to be customized is loaded. A UI-related data file (UPD file) of this base device driver is customized to create a driver set including the customized UPD file. The driver set including the customized UPD file is output as a customized driver set. This driver set has ".inf format" that supports installation by means of an "Add Printer" instruction without including any installer. Alternatively, the driver set may be packaged as that including an installer.

An example of the operation of the customize tool according to another embodiment of the present invention will be described below with reference to the flowchart of FIG. 15 and the FIG. 5 that shows the UI.

Figure 15:
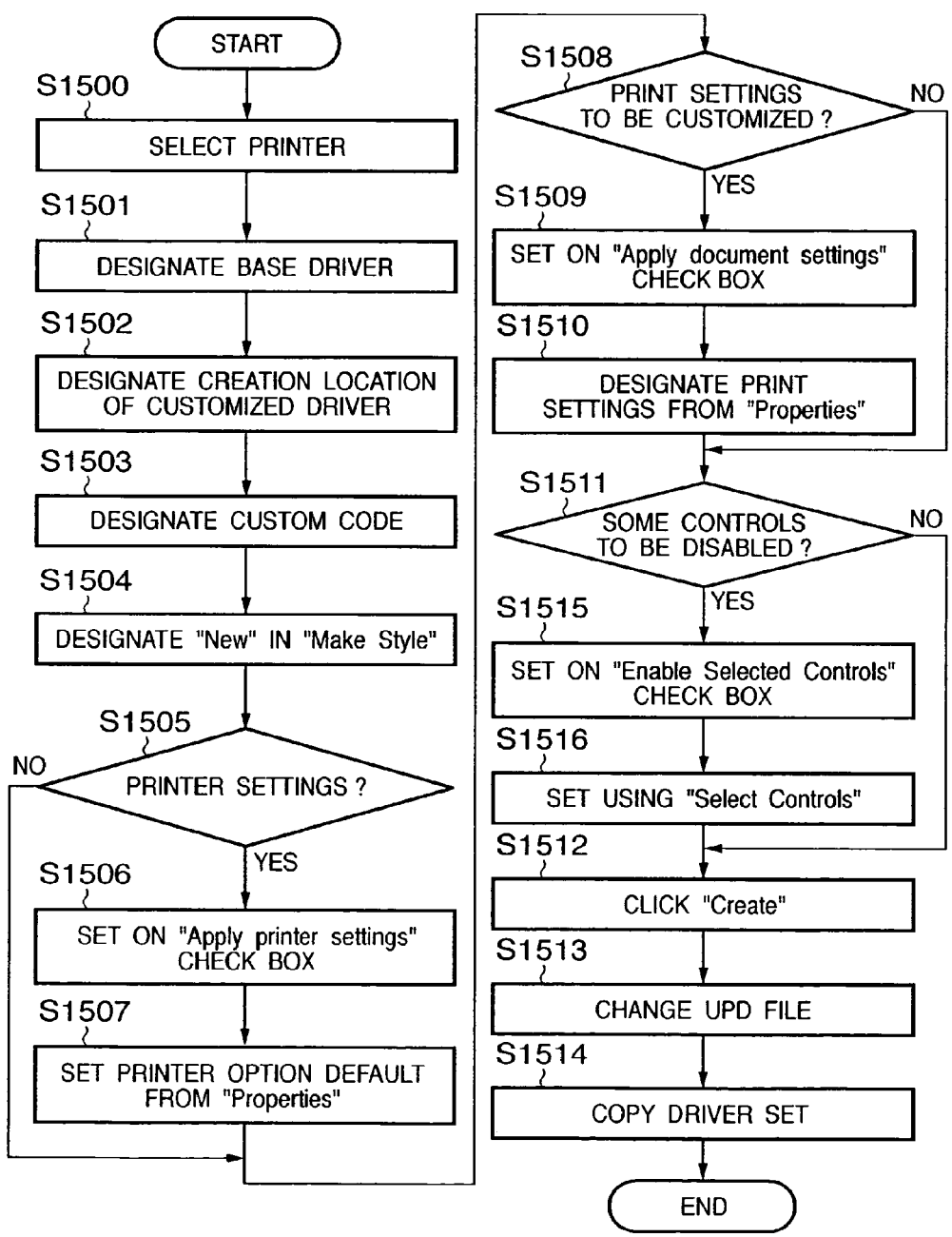
FIG. 15 is a flowchart showing the operation of the customize tool according to the embodiment of the present invention.

The operation of the customize tool shown in FIG. 15 starts in response to a user's start instruction input to the customize tool. Note that respective steps may be executed in other orders. Also, the user may make decisions in steps S1505, S1508, and S1511. Alternatively, whether or not printer settings are to be made (step S1505), whether or not print settings are to be customized (step S1508), and whether or not some controls are to be disabled (step S1511) may be described in advance in a file using true/false flags. For example, the file may describe "printer setting (S1505): YES, print setting customize (S1508): YES, disable some controls (S1510): NO", and the customize tool may load this file to execute respective checking processes based on this file.

In step S1500, a printer input to the field 701 in FIG. 5 is recognized. In step S1501, the location of a base driver input to the field 702 is recognized. The customization process of this tool is executed by changing some settings of this base driver set by the customize tool. In step S1502, the location of a customized driver to be created input to the field 703 is recognized.

Using the customized driver set created at that location, a printer driver whose default values have been changed can be installed. In step S1503, a custom code input to the field 704 is recognized. Since a different value is designated as this custom code every time a customized driver set is created, the customize tool and OS can use this value as a criterion so as to distinguish the customized driver set after installation.

Default values of the printer driver are customized in step S1504 and subsequent steps.

In step S1504, the user clicks "New" of "Make Style" to prepare for creation of a driver set designated with new default values. It is checked in step S1505 based on the aforementioned setting file if information as to whether or not option devices including a finisher that makes finishing processes such as booklet, staple, double-sided print, and the like are added is to be set. If the user makes an input indicating that the printer settings are to be made, the flow advances to step S1506; otherwise, the flow jumps to step S1508.

If it is determined in step S1505 that the printer settings are to be made, the customize tool sets ON the "Apply printer settings" check box in step S1506. After that, in step S1507 the user clicks the "Properties" button 705 to instruct the customize tool to launch the driver UI module shown in FIG. 7 and to display the UI, and he or she sets arbitrary default values. When the user clicks an OK button upon completion of settings of default values, the UI shown in FIG. 5 can be returned.

The customize tool checks in step S1508 with reference to the setting file if default values of print settings are to be customized. If it is determined that default values of print settings are to be customized, the flow advances to step S1509; otherwise, the flow jumps to step S1511.

If it is determined that default values of print settings are to be customized, the customize tool sets ON the "Apply document settings" check box in step S1509. If the user clicks the "Properties" button 706 in step S1510, the customize tool recognizes this click operation. In response to this recognition, the customize tool displays the UI shown in FIG. 6 and allows the user to set arbitrary default values as values to be managed in the customize tool. Upon completion of settings of default values, the user clicks an OK button to return to the UI in FIG. 5.

The customize tool checks in step S1511 if some controls are to be disabled. If it is determined that some controls are to be disabled, the flow advances to step S1515; otherwise, the flow jumps to step S1512.

In step S1515, the customize tool sets ON the "Enable controls" check box. In step S1516, upon detection of clicking of the "Select controls" button 707 by the user, the customize tool displays the UI in FIG. 8 and allows the user to set arbitrary default values. Upon completion of settings of default values, the UI in FIG. 5 is returned in response to an OK button clicked by the user.

If the customize tool recognizes a customized driver set creation instruction upon clicking of the "Create" button 709 in step S1512, the flow advances to step S1513. In step S1513, the customize tool copies the UPD file as a UI-related data file of the printer driver 2041, writes the customize result in that file, and temporarily holds that file.

Note that the contents of the UPD file are as has been explained with reference to FIG. 13. Upon completion of the change process of the UPD file in step S1513, the flow advances to step S1514. In step S1514, the customize tool replaces the UPD file of the base driver set by that created in step S1513, and creates a customized printer driver set at the location designated by the field 703 (Folder path to save a customized driver) in step S1503.

More specifically, a new ID is defined for a GPD file, and setting values customized in steps S1507 and S1510 via the driver are stored in this file as data. Also, controls set in step S1516 are listed as controls to be disabled in the GPD file or a file defined independently of this file in association with an ID defined independently of the aforementioned ID. These customize files are combined as a driver package.

The printer driver loads these customized GPD file and list (GPD) of controls to be disabled (which may be included in that file) included in the package, so as to call customized print settings and to display the user interface of the customized printer driver.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-012178 filed on Jan. 20, 2004, and Japanese Patent Application No. 2004-364777 filed on Dec. 16, 2004 which are hereby incorporated by reference herein.

What is claimed is:

1. An information processing apparatus comprising:
a display unit configured to display a user interface of an application for determining at least one print setting item of a printer driver, for which a user cannot change a setting value on a user interface of the printer driver; and
a creation unit configured to create a file for installing the printer driver in which the user cannot change the setting value of the at least one print setting item, wherein the file is created based on the at least one print setting item of the printer driver determined from the user interface,
wherein, by the printer driver installed using the created file, the user cannot change the setting value on the user interface for the at least one print setting item,
wherein at least one of the display unit and the creation unit is implemented using a CPU.

2. The apparatus according to claim 1, wherein the creation unit creates a file in which a default value selected by the user is reflected in the print setting items included in the user interface of the printer driver.

3. The apparatus according to claim 1, further comprising a second selection unit configured to select the printer driver to be customized.

4. The apparatus according to claim 1, wherein, if the apparatus reads the file created by the creation unit and receives an instruction for displaying version information of the printer driver, the display unit displays information indicating that the printer driver has been customized.

5. The apparatus according to claim 1, wherein the creation unit creates a printer driver set including a file having a customize result by the application written therein.

6. A method performed by an information processing apparatus, the method comprising steps of:
displaying a user interface of an application for determining at least one print setting item of a printer driver, for which a user cannot change a setting value on a user interface of the printer driver;
disabling a selected control for a determined at least one print setting item for which a user cannot change the setting value; and
creating a file for installing the printer driver in which the user cannot change the setting value of the at least one print setting item, wherein the file is created based on the at least one print setting item of the printer driver determined from the user interface,
wherein, by the printer driver installed using the created file, the user cannot change the setting value on the user interface for the at least one print setting item.

7. The method according to claim 6, wherein the creating step includes creating a file in which a default value selected by the user is reflected in the print setting items included in the user interface of the printer driver.

8. The method according to claim 6, further comprising a step of selecting the printer driver to be customized.

9. The method according to claim 6, wherein, if the apparatus reads the file created in the creating step and receives an instruction for displaying version information of the printer driver, information indicating that the printer driver has been customized is displayed.

10. The method according to claim 6, wherein the creating step includes creating a printer driver set including a file having a customize result by the application written therein.

11. A non-transitory computer-readable storage medium storing computer code that when executed causes an information processing method to be performed by a computer of an information processing apparatus, wherein the method comprises steps of:
displaying a user interface of an application for determining at least one print setting item of a printer driver, for which a user cannot change a setting value on a user interface of the printer driver;
disabling a selected control for a determined at least one print setting item for which a user cannot change the setting value; and
creating a file for installing the printer driver in which the user cannot change the setting value of the at least one print setting item, wherein the file is created based on the at least one print setting item of the printer driver determined from the user interface,
wherein, by the printer driver installed using the created file, the user cannot change the setting value on the user interface for the at least one print setting item.

12. The non-transitory computer-readable storage medium according to claim 11, wherein the creating step includes creating a file in which a default value selected by the user is reflected in the print setting items included in the user interface of the printer driver.

13. The non-transitory computer-readable storage medium according to claim 11, wherein the method further comprises a step of selecting the printer driver to be customized.

14. The non-transitory computer-readable storage medium according to claim 11, wherein, when the apparatus reads the file created in the creating step and receives an instruction for displaying version information of the printer driver, information indicating that the printer driver has been customized is displayed.

* * * * *